(12) United States Patent
Imai et al.

(10) Patent No.: US 6,812,659 B2
(45) Date of Patent: Nov. 2, 2004

(54) APPARATUS FOR CONTROLLING BRUSHLESS MOTOR

(75) Inventors: Nobuyuki Imai, Wako (JP); Yutaka Takahashi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/616,973

(22) Filed: Jul. 11, 2003

(65) Prior Publication Data

US 2004/0008006 A1 Jan. 15, 2004

(30) Foreign Application Priority Data

Jul. 12, 2002 (JP) ........................................ 2002-204374

(51) Int. Cl.[7] .............................................. H02P 5/06
(52) U.S. Cl. ...................... 318/254; 318/432; 318/632; 318/609; 318/610
(58) Field of Search .............................. 318/138, 254, 318/432, 439, 609, 610, 632

(56) References Cited

U.S. PATENT DOCUMENTS

| | | | | |
|---|---|---|---|---|
| 5,400,240 A | * | 3/1995 | Araki | 363/97 |
| 5,565,752 A | * | 10/1996 | Jansen et al. | 318/807 |
| 5,656,911 A | * | 8/1997 | Nakayama et al. | 318/718 |
| 6,018,225 A | * | 1/2000 | Garces | 318/798 |
| 6,320,349 B1 | * | 11/2001 | Kaneko et al. | 318/798 |
| 6,396,229 B1 | * | 5/2002 | Sakamoto et al. | 318/439 |
| 6,407,531 B1 | * | 6/2002 | Walters et al. | 318/805 |
| 6,608,456 B2 | * | 8/2003 | Imai et al. | 318/254 |
| 6,707,565 B2 | * | 3/2004 | Ohira et al. | 358/1.15 |
| 6,737,828 B2 | * | 5/2004 | Kiuchi et al. | 318/779 |

FOREIGN PATENT DOCUMENTS

JP    2002-320398    10/2002

OTHER PUBLICATIONS

U.S. patent application Pub. No. US 2002/0149335 A1, published Oct. 17, 2002.

* cited by examiner

Primary Examiner—Rina Duda
(74) Attorney, Agent, or Firm—Arent Fox PLLC

(57) ABSTRACT

An angle detector 25 detects a rotor angle θ of a DC brushless motor 1 using a current value Iu_s detected by a U-phase current sensor 23 and a current value Iw_s detected by a W-phase current sensor 24 when high-frequency voltages vu, vv, vw for detecting a rotor angle are applied by a high-frequency adding unit 21. The high-frequency adding unit 21 determines the high-frequency voltages vu, vv, vw so that the direction of rotation of the motor 1 and the direction of a revolving magnetic field generated by the high-frequency voltages vu, vv, vw will be opposite to each other. A three-phase/dq converter 26 converts the current values Iw_s, Iu_s into a detected d-axis current Id_s and a detected q-axis current Iq_s using the rotor angle θ detected by the angle detector 25.

4 Claims, 2 Drawing Sheets

APPARATUS FOR CONTROLLING BRUSHLESS MOTOR

BACKGROUND OF THE INVENTION

1. Field of the Invention

The present invention relates to an apparatus for controlling a salient-pole DC brushless motor by controlling armature currents of the motor based on a rotor angle thereof which is detected without using a position detection sensor.

2. Description of the Related Art

For energizing a DC brushless motor to produce a desired torque, it is necessary to apply voltages to the armatures in suitable phases corresponding to the electric angle of the rotor (hereinafter referred to as "rotor angle") which has magnetic poles. There have been proposed various processes of detecting a rotor angle without using a position detection sensor in order to reduce the cost of the DC brushless motor and a motor control apparatus therefor by way of dispensing with any position detection sensor for detecting the rotor angle.

The inventors of the present application have proposed a rotor angle detector for detecting a rotor angle of a DC brushless motor without using a position detection sensor in an earlier patent application (Japanese patent laid-open publication No. 2002-320398). The disclosed rotor angle detector operates as follows: When high-frequency voltages are added to drive voltages that are applied to three-phase armatures of a salient-pole DC brushless motor, the rotor angle detector uses a detected value of a current flowing through the first-phase armature, a detected value of a current flowing through the second-phase armature, and high-frequency components depending on the high-frequency voltages to calculate a sine reference value depending on the sine value of a twofold angle which is twice the rotor angle of the DC brushless motor and a cosine reference value depending on the cosine value of the twofold angle. Then, the rotor angle detector calculates the rotor angle of the DC brushless motor using the sine reference value and the cosine reference value which have been calculated.

A motor control apparatus for controlling the DC brushless motor performs a feedback control process on currents flowing through the armatures of the DC brushless motor to determine drive voltages to be applied to the armatures so that detected values of the armature currents (hereinafter referred to as "detected armature currents") will be equalized to predetermined command currents. Because the high-frequency voltages are added to the drive voltages, high-frequency components are added to the detected armature currents.

The motor control apparatus has low-pass filters to remove such high-frequency components from the detected armature currents. However, if the high-frequency components are not sufficiently removed from the detected armature currents, then the differences between the detected armature currents and the command currents increase due to the high-frequency components added to the detected armature currents, tending to lower the ability of the DC brushless motor to cause its output torque to follow the command currents in the feedback control process.

SUMMARY OF THE INVENTION

It is therefore an object of the present invention to provide an apparatus for controlling a DC brushless motor to reduce adverse effects which armature currents have on a feedback control process when high-frequency voltages for detecting a rotor angle are added to drive voltages of the DC brushless motor.

According to the present invention, there is provided an apparatus for controlling a salient-pole DC brushless motor having armatures in three phases, comprising voltage applying means for applying drive voltages to the armatures, high-frequency adding means for adding high-frequency voltages to the drive voltages, first current detecting means for detecting a current flowing through an armature in a first phase of the armatures in the three phases, second current detecting means for detecting a current flowing through an armature in a second phase of the armatures in the three phases, reference value extracting means for extracting a sine reference value depending on the sine value of a twofold angle which is twice a rotor angle of the motor and a cosine reference value depending on the cosine value of the two-fold angle, using a first current value detected by the first current detecting means and a second current value detected by the second current detecting means when the high-frequency voltages are added to the drive voltages by the high-frequency adding means, and high-frequency components depending on the high-frequency voltages, rotor angle calculating means for calculating a rotor angle of the motor using the sine reference value and the cosine reference value, three-phase/dq converting means for handling the motor as an equivalent circuit having a q-axis armature disposed on an q-axis in the direction of magnetic fluxes from a rotor of the motor and a d-axis armature disposed on a d-axis which is perpendicular to the q-axis, and calculating a detected q-axis current flowing through the q-axis armature and a detected d-axis current flowing through the d-axis armature based on the rotor angle of the motor which is calculated by the rotor angle calculating means, the first current value, and the second current value, and current control means for determining the drive voltages so that a q-axis reference current produced by passing the detected q-axis current through a low-pass filter and a d-axis reference current produced by passing the detected d-axis current through a low-pass filter will be equalized to a predetermined q-axis command current and a predetermined d-axis command current, respectively.

According to the apparatus for controlling a DC brushless motor of the present invention, the high-frequency voltages are set so that the direction of a revolving magnetic field generated when the high-frequency voltages are applied to the armatures of the motor and the direction in which the motor is rotated by the drive voltages are opposite to each other.

With the above arrangement, as described in detail later on, since the high-frequency voltages are set so that the direction of a revolving magnetic field generated when the high-frequency voltages are applied to the armatures of the motor and the direction in which the motor is rotated by the drive voltages are opposite to each other, the frequencies of high-frequency currents added to the detected q-axis current and the detected d-axis current which are calculated by the three-phase/dq converting means are higher than if the high-frequency voltages are set so that the direction of a revolving magnetic field generated when the high-frequency voltages are applied to the armatures of the motor and the direction in which the motor is rotated by the drive voltages are the same as each other.

Consequently, the ability of the low-pass filters to attenuate the high-frequency currents added to the detected q-axis current and the detected d-axis current is increased, reducing the difference between the q-axis reference current and the q-axis command current and the difference between the d-axis reference current and the d-axis command current due to the high-frequency currents. Therefore, the ability of the motor to cause its output torque to follow the d-axis command current and the q-axis command current is increased.

According to the method of detecting a rotor angle of a DC brushless motor of the present invention, there is provided a method of detecting the rotor angle of the DC brushless motor controlled by an apparatus, said apparatus comprising voltage applying means for applying drive voltages to the armatures, first current detecting means for detecting a current flowing through an armature in a first phase of the armatures in the three phases, second current detecting means for detecting a current flowing through an armature in a second phase of the armatures in the three phases, three-phase/dq converting means for handling the motor as an equivalent circuit having a q-axis armature disposed on a q-axis in the direction of magnetic fluxes from a rotor of the motor and a d-axis armature disposed on a d-axis which is perpendicular to the q-axis, and calculating a detected q-axis current flowing through the q-axis armature and a detected d-axis current flowing through the d-axis armature based on the rotor angle of the motor which is calculated by the rotor angle calculating means, the first current value, and the second current value, and current control means for determining the drive voltages so that a q-axis reference current produced by passing the detected q-axis current through a low-pass filter and a d-axis reference current produced by passing the detected d-axis current through a low-pass filter will be equalized to a predetermined q-axis command current and a predetermined d-axis command current, respectively.

The method is characterized by comprising the step of adding the high-frequency voltages, which are set so that the direction of a revolving magnetic field generated when said high-frequency voltages are applied to the armatures of said motor and the direction in which said motor is rotated by said drive voltages are opposite to each other, to said drive voltage, calculating a sine reference value depending on the sine value of a twofold angle which is twice a rotor angle of said motor and a cosine reference value depending on the cosine value of the twofold angle, using a first current value detected by said first current detecting means and a second current value detected by said second current detecting means when said high-frequency voltages are added to said drive voltages, and high-frequency components depending on said high-frequency voltages: and a step of calculating a rotor angle of said motor using said sine reference value and said cosine reference value.

With the above arrangement, the ability of the low-pass filters to attenuate the high-frequency currents added to the detected q-axis current and the detected d-axis current is increased, reducing the difference between the q-axis reference current and the q-axis command current and the difference between the d-axis reference current and the d-axis command current due to the high-frequency currents. Therefore, the ability of the motor to cause its output torque to follow the d-axis command current and the q-axis command current is increased, and thus the rotor angle of the motor can be detected.

According to the present invention, furthermore, the reference value extracting means comprises means for extracting the sine reference value and the cosine reference value respectively according to the following equations (1), (2)

$$Vs = \int_0^{\frac{2\pi}{\omega}} \left\{ \cos 2\omega t \cos\left(\omega t + \frac{2}{3}\pi\right) \cdot Iu - \cos 2\omega t \cos \omega t \cdot Iw \right\} dt \quad (1)$$

$$Vc = \sim \int_0^{\frac{2\pi}{\omega}} \left\{ \sin 2\omega t \cos\left(\omega t + \frac{2}{3}\pi\right) \cdot Iu - \sin 2\omega t \cos \omega t \cdot Iw \right\} dt \quad (2)$$

where Vs: the sine reference value, Vc: the cosine reference value, Iu: the first current value, Iw: the second current value, and a: the angular velocity of the high-frequency voltages.

The reference value extracting means can extract the sine reference value (Vs) and the cosine reference value (Vc) from the first current value (Iu), the second current value (Iw), and the angular velocity (X) of the high-frequency voltages according to the above equations (1), (2). The rotor angle calculating means can then calculate a rotor angle of the motor using the sine reference value (Vs) and the cosine reference value (Vc) thus calculated.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
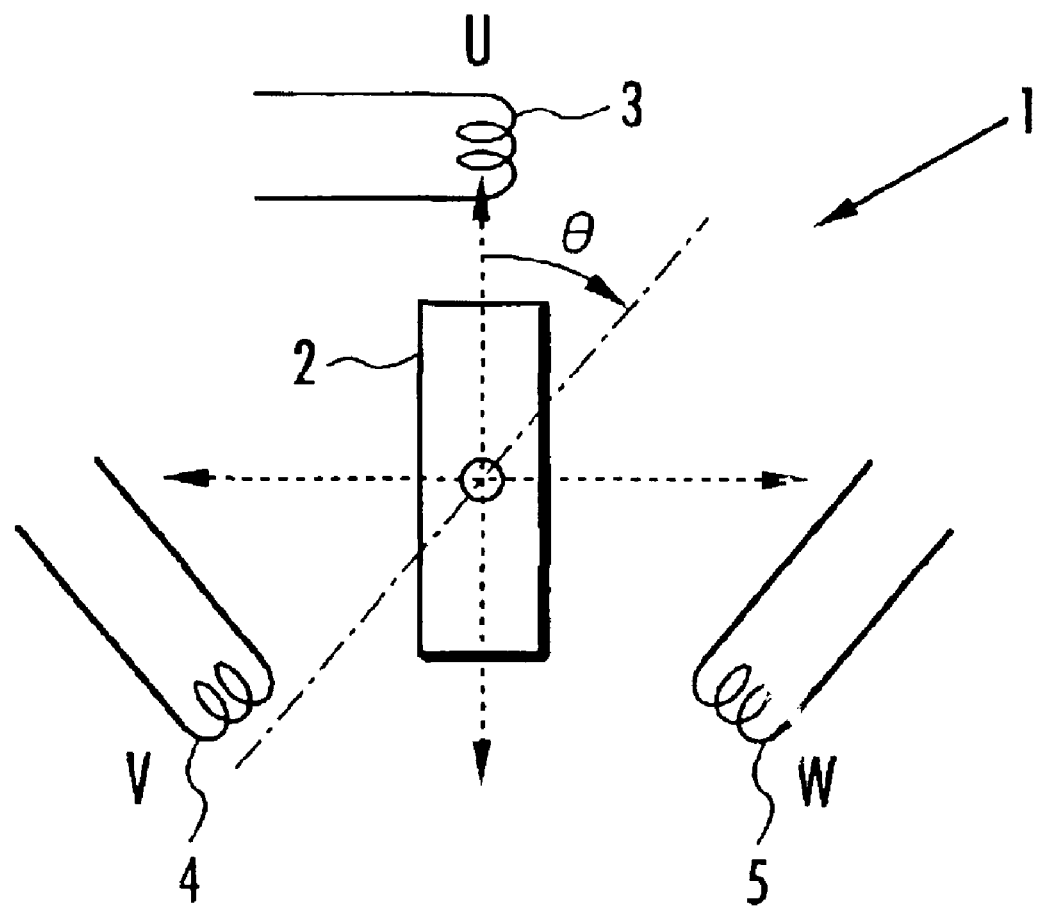
FIG. 1 is a schematic diagram of a DC brushless motor to be controlled by a brushless motor control apparatus according to the present invention.
Figure 2:
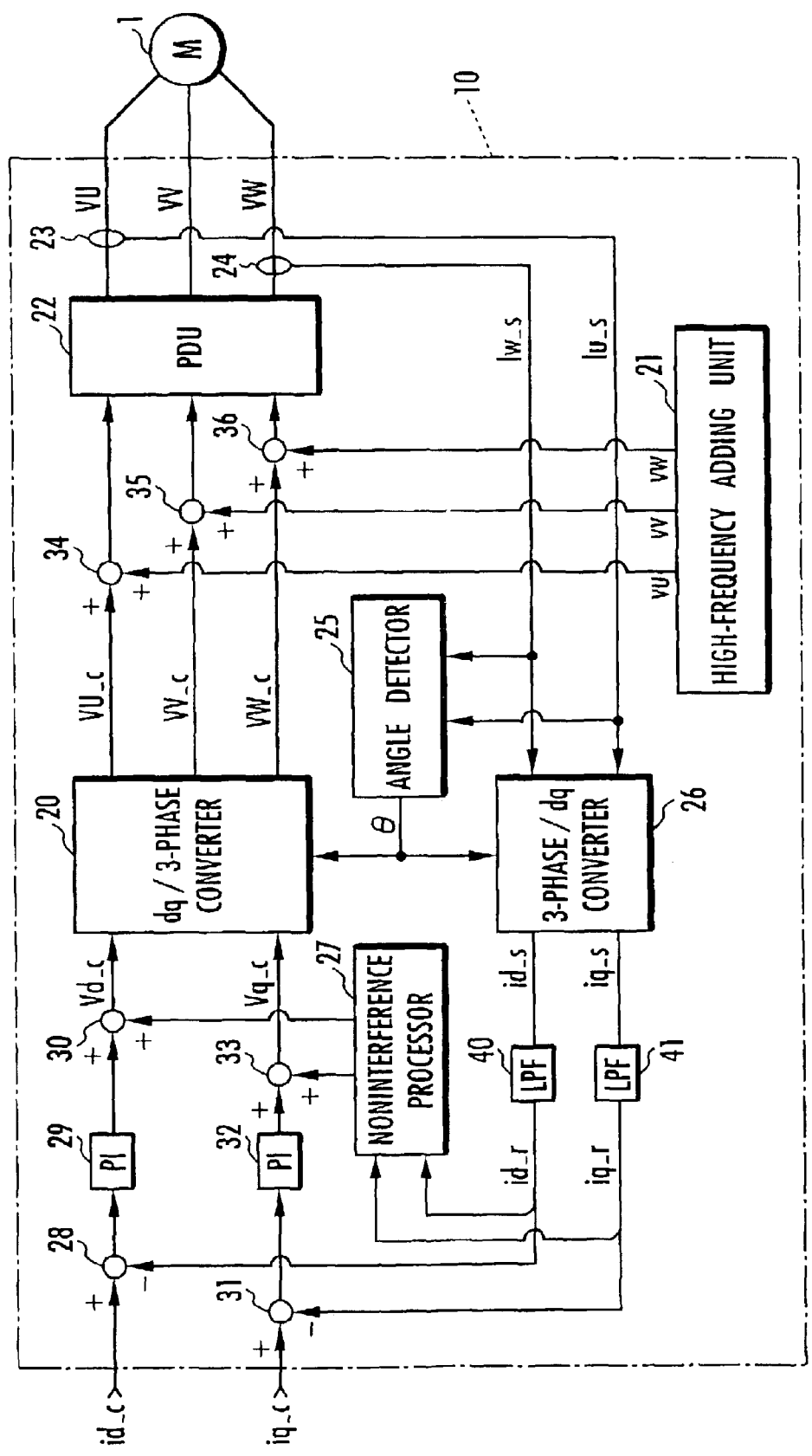
FIG. 2 is a block diagram of a motor controller as the brushless motor control apparatus according to the present invention for controlling the DC brushless motor shown in FIG. 1.

As shown in FIG. 2, a motor controller 10, which serves as an apparatus for controlling a DC brushless motor according to the present invention), controls currents flowing through armatures 3, 4, 5 of a salient-pole DC brushless motor 1 shown in FIG. 1 according to a feedback control process. The motor controller 10 handles an equivalent circuit that is converted from the DC brushless motor 1 (hereinafter referred to as "motor 1"), the equivalent circuit being of a dq coordinate system having a q-axis armature disposed on an q-axis which is the same as the direction of magnetic fluxes from the field magnetic poles of a rotor 2 and a d-axis armature disposed on a d-axis which is perpendicular to the q-axis.

The motor controller 10 controls the voltages applied to the three-phase armatures of the motor 1 so that a d-axis command current Id_c supplied from an external source as a command value for a current flowing through the d-axis armature (hereinafter referred to as "d-axis current") and a q-axis command current Iq_c supplied from the external source as a command value for a current flowing through the q-axis armature (hereinafter referred to as "q-axis current") will be equalized respectively to a detected d-axis current Id_s and a detected q-axis current Iq_s which are calculated from detected values of currents actually flowing through the respective three-phase armatures of the motor 1 by a three-phase/dq conversion process.

The motor controller 10 comprises a dq/3-phase converter 20 for converting a command value Vd_c for a voltage applied to the d-axis armature (hereinafter referred to as "d-axis voltage") and a command value Vq_c for a voltage applied to the q-axis armature (hereinafter referred to as "q-axis voltage") into command values VU_c, VV_c, VW_c for drive voltages applied respectively to the armatures in three phases U, V, W of the motor 1, a high-frequency adding unit 21 (corresponding to a high-frequency adding means according to the present invention) for adding high-frequency voltages vu, vv, vw respectively to the output voltages VU_c, VV_c, VW_c from the dq/3-phase converter 20, and a power drive unit 22 (corresponding to a voltage applying means according to the present invention) for applying voltages VU, VV, VW depending on the voltages VU_c, VV_c, VW_c to which the high-frequency voltages vu, vv, vw have been added, respectively to the armatures in the three phases U, V, W of the motor 1.

The motor controller 10 also comprises a U-phase current sensor 23 (corresponding to a first current detecting means according to the present invention) for detecting a current flowing through the armature in a U-phase (corresponding to a first phase according to the present invention) of the motor 1, a W-phase current sensor 24 (corresponding to a second current detecting means according to the present invention) for detecting a current flowing through the armature in a W-phase (corresponding to a second phase according to the present invention) of the motor 1, an angle detector 25 for detecting a rotor angle θ (see FIG. 1) of the motor 1 using a current value Iu_s detected by the U-phase current sensor 23 and a current value Iw_s detected by the W-phase current sensor 24, a three-phase/dq converter 26 (corresponding to a three-phase/dq converting means according to the present invention) for calculating the detected d-axis current Id_s and the detected q-axis current Iq_s using the current value Iu_s and the current value Iw_s, and a noninterference processor 27 for canceling the effects of velocity electromotive forces that interfere with each other between the d-axis and the q-axis.

The motor controller 10 also has a first subtractor 28, a first PI processor 29, a first adder 30, a second subtractor 31, a second PI processor 32, and a second adder 33.

The first subtractor 28 subtracts a d-axis reference current Id_r, which is produced by removing a high-frequency component higher than a predetermined frequency from the detected d-axis current Id_s with a first low-pass filter 40, from the d-axis command current Id_c. The first PI processor 29 performs a PI (Proportional plus Integral) process on the difference produced by the first subtractor 28. The first adder 30 adds a noninterference component to an output signal from the first PI processor 29, thus generating the command value Vd_c for the d-axis voltage depending on the difference between the d-axis command current Id_c and the d-axis reference current Id_r.

Similarly, the second subtractor 31 subtracts a q-axis reference current Iq_r, which is produced by removing a high-frequency component higher than a predetermined frequency from the detected q-axis current Iq_s with second first low-pass filter 41, from the q-axis command current Iq_c. The second PI processor 32 performs a PI process on the difference produced by the second subtractor 31. The second adder 33 adds a noninterference component to an output signal from the second PI processor 32, thus generating the command value Vq_c for the q-axis voltage depending on the difference between the q-axis command current Iq_c and the q-axis reference current Iq_r.

The command value Vd_c for the d-axis voltage and the command value Vq_c for the q-axis voltage are supplied to the dq/3-phase converter 20. In this manner, the power drive unit 22 applies the three-phase voltages VW, W, VW to the respective armatures of the motor 1 in order to eliminate the difference between the d-axis command current Id_c and the d-axis reference current Id_r and the difference between the q-axis command current Iq_c and the q-axis reference current Iq_r, for thereby feedback-controlling the currents flowing through the armatures of the motor 1.

The first subtractor 28, the second subtractor 31, the first PI processor 29, the second PI processor 32, the dq/three-phase converter 20, and the power drive unit 22 jointly make up a current control means according to the present invention.

In order for the three-phase/dq converter 26 to calculate the detected d-axis current Ides and the detected q-axis current Iq_s from the current value Iu_s detected by the U-phase current sensor 23, the current value Iw_s detected by the W-phase current sensor 24, and the rotor angle θ of the motor 1 according to the equations (3), (4) shown below, the motor controller 10 needs to detect the rotor angle θ.

$$id = \sqrt{2}\left\{ Iu \cdot \sin\left(\theta + \frac{2}{3}\pi\right) - Iw \cdot \sin\theta \right\} \quad (3)$$

$$iq = \sqrt{2}\left\{ Iu \cdot \cos\left(\theta + \frac{2}{3}\pi\right) - Iw \cdot \cos\theta \right\} \quad (4)$$

The motor controller 10 detects the rotor angle θ by adding the high-frequency voltages vu, vv, vw (expressed by the equation (5) shown below) output from the high-frequency adding unit 21 respectively to the command values VU_c, VV_c, VW_c for drive voltages applied respectively to the U, V, W phases, which command values VU_c, VV_c, VW_c are output from the dq/3-phase converter 20 without using a position detection sensor such as a resolver or the like.

$$\begin{bmatrix} vu \\ vv \\ vw \end{bmatrix} = \omega \begin{bmatrix} \sin\omega t \\ \sin\left(\omega t - \frac{2}{3}\pi\right) \\ \sin\left(\omega t - \frac{4}{3}\pi\right) \end{bmatrix} \quad (5)$$

Specifically, a third adder 34 adds the high-frequency voltage vu to the command value VU_c, a fourth adder 35 adds the high-frequency voltage vv to the command value VV_c, and a fifth adder 36 adds the high-frequency voltage vw to the command value VW_c. The angle detector 25 detects the rotor angle e using the current value Iu_s which is detected by the U-phase current sensor 23 and the current value Iw_s which is detected by the W-phase current sensor 23 when the high-frequency voltages vu, vv, vw are added. The angle detector 25 performs the functions of a reference value extracting means and a rotor angle calculating means according to the present invention.

The angle detector 25 puts the current value Iu_s detected by the U-phase current sensor 23 and the current value Iw_s detected by the W-phase current sensor puts an angular velocity (of the high-frequency voltages vu, vv, vw in the equation (5) added by the high-frequency adding unit 21 into 0 in the equations (3), (4), and calculates a sine reference value Vs and a cosine reference value Vc which are twice the rotor angle θ according to the following equations (6), (7):

$$Vs = \int_0^{\frac{\pi}{\omega}} \left\{\cos 2\omega t \cos\left(\omega t + \frac{2}{3}\pi\right) \cdot Iu - \cos 2\omega t \cos\omega t \cdot Iw\right\} dt \quad (6)$$

$$= -K\frac{3\sqrt{3}\,\Delta l}{2} \int_0^{\frac{2\pi}{\omega}} \cos 2\omega t \sin(2\omega t - 2\theta) dt +$$

$$\int_0^{\frac{2\pi}{\omega}} \left[\cos 2\omega t \cdot \cos\left(\omega t + \frac{2}{3}\pi\right) \cdot Iudc - \cos 2\omega t \cdot \cos\omega t \cdot Iwdc\right] dt$$

$$= -K\frac{3\sqrt{3}\,\Delta l}{2} \int_0^{\frac{2\pi}{\omega}} \left[\frac{\sin 4\omega t}{2}\cos 2\theta - \frac{1+\cos 4\omega t}{2}\sin 2\theta\right] dt +$$

$$\int_0^{\frac{2\pi}{\omega}} \left[\frac{\cos\left(3\omega t + \frac{2}{3}\pi\right) + \cos\left(\omega t - \frac{2}{3}\pi\right)}{2} Iudc - \frac{\cos 3\omega t + \cos\omega t}{2} Iwdc\right] dt$$

$$= \frac{2\pi}{\omega} K \frac{3\sqrt{3}\,\Delta l}{4} \sin 2\theta$$

$$Vc = \int_0^{\frac{2\pi}{\omega}} \left\{\cos 2\omega t \cos\left(\omega t + \frac{2}{3}\pi\right) \cdot Iu - \sin 2\omega t \cos\omega t \cdot Iw\right\} dt \quad (7)$$

$$= K\frac{3\sqrt{3}\,\Delta l}{2} \int_0^{\frac{\pi}{\omega}} \sin 2\omega t \sin(2\omega t - 2\theta) dt +$$

$$\int_0^{\frac{2\pi}{\omega}} \left[\sin 2\omega t \cdot \cos\left(\omega t + \frac{2}{3}\pi\right) \cdot Iudc - \sin 2\omega t \cdot \cos\omega t \cdot Iwdc\right] dt$$

$$= K\frac{3\sqrt{3}\,\Delta l}{2} \int_0^{\frac{2\pi}{\omega}} \left[\frac{1-\cos 4\omega t}{2}\cos 2\theta - \frac{\sin 4\omega t}{2}\sin 2\theta\right] dt +$$

$$\int_o^{\frac{2\pi}{\omega}} \left[\frac{\sin\left(3\omega t + \frac{2}{3}\pi\right) + \sin\left(\omega t - \frac{2}{3}\pi\right)}{2} Iudc - \frac{\sin 3\omega t + \sin\omega t}{2} Iwdc\right] dt$$

$$= \frac{2\pi}{\omega} K \frac{3\sqrt{3}\,\Delta l}{4} \cos 2\theta$$

where Iudc: a DC component of the current flowing through the U-phase armature, and Iwdc: a DC component of the current flowing through the W-phase armature.

Sine and cosine-components with respect to ωt in the equations (6), (7) correspond to the high-frequency components depending on the added high-frequency voltages according to the present invention. A calculation gain K in the equations (6), (7) is expressed by the following equation (8):

$$K = \frac{1}{2(l-m) \cdot l - \Delta l^2 \left(\frac{3}{2} + 3\cos\frac{2}{3}\pi\right)} \quad (8)$$

where l: a DC component of the self-inductance of each of the phases of the motor 1, $\Delta l$: a change in the DC component l, and m: a DC component of the mutual inductance between the phase of the motor 1.

In the equations (6), (7), an integration period is set to $0-2\pi/\omega$ to equalize integrated values with respect to the DC components Iudc, Iwdc of the currents Iu, Iw to 0. However, if the currents Iu, Iw do not include DC components and are expressed by the equations (9), (10) shown below, then the sine reference value Vs and the cosine reference value Vc can be calculated even with an integration period being set to $0-\pi/\omega$, according to the following equations (11), (12):

$$Iu = K\left[-(l-m)\cos\omega t - \frac{3\Delta l}{2}\cos(2\theta - \omega t)\right] \quad (9)$$

$$Iw = K\left[-(l-m)\cos\left(\omega t + \frac{2}{3}\pi\right) - \frac{3\Delta l}{2}\cos\left(2\theta - \omega t + \frac{2}{3}\pi\right)\right] \quad (10)$$

$$Vs = \int_0^{\frac{\pi}{\omega}} \left\{\cos 2\omega t \cos\left(\omega t + \frac{2}{3}\pi\right) \cdot Iu - \cos 2\omega t \cos\omega t \cdot Iw\right\} dt \quad (11)$$

$$= -K\frac{3\sqrt{3}\,\Delta l}{2} \int_0^{\frac{\pi}{\omega}} \cos 2\omega t \sin(2\omega t - 2\theta) dt$$

$$= -K\frac{3\sqrt{3}\,\Delta l}{2} \int_0^{\frac{\pi}{\omega}} \cos 2\omega t (\sin 2\omega t \cos 2\theta - \cos 2\omega t \sin 2\theta) dt$$

$$= -K\frac{3\sqrt{3}\,\Delta l}{2} \int_0^{\frac{\pi}{\omega}} \left[\frac{\sin 4\omega t}{2}\cos 2\theta - \frac{1+\cos 4\omega t}{2}\sin 2\theta\right] dt$$

$$= K\frac{3\sqrt{3}\,\Delta l}{4} \sin 2\theta$$

$$Vc = -\int_0^{\frac{\pi}{\omega}} \left\{\sin 2\omega t \cos\left(\omega t + \frac{2}{3}\pi\right) \cdot Iu - \sin 2\omega t \cos\omega t \cdot Iw\right\} dt \quad (12)$$

$$= K\frac{3\sqrt{3}\,\Delta l}{2} \int_0^{\frac{\pi}{\omega}} \sin 2\omega t \sin(2\omega t - 2\theta) dt$$

$$= K\frac{3\sqrt{3}\,\Delta l}{2} \int_0^{\frac{\pi}{\omega}} \sin 2\omega t (\sin 2\omega t \cos 2\theta - \cos 2\omega t \sin 2\theta) dt$$

$$= K\frac{3\sqrt{3}\,\Delta l}{2} \int_0^{\frac{\pi}{\omega}} \left[\frac{1-\cos 4\omega t}{2}\cos 2\theta - \frac{\sin 4\omega t}{2}\sin 2\theta\right] dt$$

$$= K\frac{3\sqrt{3}\,\Delta l}{4} \cos 2\theta$$

The rotor angle $\theta$ of the motor 1 can be calculated according to the following equation (13) based on the equations (6), (7) or the equations (11), (12):

$$\theta = \frac{1}{2}\tan^{-1}\frac{Vs}{Vc} \quad (13)$$

The $\tan^{-1}$ function changes largely as the sine reference value Vs and the cosine reference value Vc change. Therefore, when the rotor angle $\theta$ of the motor 1 is calculated according to the equation (13), an error in detecting the rotor angle $\theta$ may possibly become large due to an error caused in calculating the sine reference value Vs and the cosine reference value Vc.

To avoid the above error, based on the equation (14) shown below, $\Delta\theta$ expressed by the equation (15) shown below may be calculated as phase difference data depending on the phase difference $(\theta-\hat{\theta})$ between an estimated value $\hat{\theta}$ of the rotor angle and an actual value $\theta$ of the rotor angle, and the rotor angle may be calculated according to a follow-up calculation process effected by an observer represented by the equation (16) shown below which is constructed to eliminate the phase difference $(\theta-\hat{\theta})$.

In this case, changes in the gain due to changes in the magnitude $(\sqrt{(Vs^2+Vc^2)})$ of the high-frequency components can be suppressed for increased stability in calculating the rotor angle.

$$Vs \cdot \cos 2\hat{\theta} - Vc \cdot \sin 2\hat{\theta} = \sqrt{Vs^2 + Vc^2} \sin(2\theta - 2\hat{\theta}) \quad (14)$$

$$\approx \sqrt{Vs^2 + Vc^2} \cdot 2(\theta - \hat{\theta}) \text{ (if } (\theta - \hat{\theta}) \approx 0)$$

-continued $$\Delta\theta = 2(\theta - \hat{\theta}) \approx \sin(2\theta - 2\hat{\theta}) \quad (15)$$

$$= \frac{Vs \cdot \cos 2\hat{\theta} - Vc \cdot \sin 2\hat{\theta}}{\sqrt{Vs^2 + Vc^2}}$$

$$\begin{bmatrix} \hat{\theta}(n+1) \\ \hat{\omega}(n+1) \end{bmatrix} = \begin{bmatrix} 1 & \Delta t \\ 0 & 1 \end{bmatrix} \begin{bmatrix} \hat{\theta}(n) \\ \hat{\omega}(n) \end{bmatrix} + \begin{bmatrix} K1 \\ K2 \end{bmatrix} \frac{2(\theta(n) - \hat{\theta}(n))}{\sqrt{Vs^2 + Vc^2}} \quad (16)$$

where $\theta(n)$, $\hat{\theta}(n)$, $\hat{\omega}(n)$ represent actual and estimated values of the rotor angle $\theta$ and an estimated value of the angular velocity $\omega$ of the rotor 2, respectively, at a certain sampling time n, $\hat{\theta}(n+1)$, $\hat{\omega}(n+1)$ represent an estimated value of the rotor angle $\theta$ and an estimated value of the angular velocity $\omega$ of the rotor 2, respectively, at a next sampling time n+1, $\Delta t$ represents a sampling period, and K1, K2 represent calculation gains.

If the angle detector 25 has its calculation ability so poor that it poses a problem on the time required to calculate the square root in the equation (15), then the equation (15) may be approximated by the following equation (17):

$$\Delta\theta = 2(\theta - \hat{\theta}) \approx \sin(2\theta - 2\hat{\theta}) \quad (17)$$

$$= \begin{cases} \frac{Vs \cdot \cos 2\hat{\theta} - Vc \cdot \sin 2\hat{\theta}}{|Vs|} & (|Vs| > |Vc|) \\ \frac{Vs \cdot \cos 2\hat{\theta} - Vc \cdot \sin 2\hat{\theta}}{|Vc|} & (|Vc| > |Vs|) \end{cases}$$

In the present embodiment, the angle detector 25 integrates the high-frequency components that change with time according to the equations (6), (7), thereby calculating the sine reference value Vs and the cosine reference value Vc which are twice the rotor angle $\theta$. Alternatively, the angle detector 25 may output the sine reference value Vs and the cosine reference value Vc through a low-pass filter.

The three-phase/dq converter 26 carries out the three-phase/dq conversion process according to the following equation (18) based on the fact that the sum of the currents flowing through the respective armatures 3, 4, 5 of the motor 1 is nil:

$$\begin{bmatrix} Id \\ Iq \end{bmatrix} = \frac{2\sqrt{3}}{3} \begin{bmatrix} \sin[\theta + \frac{\pi}{6}] & \cos\theta \\ \cos[\theta + \frac{\pi}{6}] & -\sin\theta \end{bmatrix} \begin{bmatrix} Iu \\ Iw \end{bmatrix} \quad (18)$$

When the high-frequency adding unit 21 adds the high-frequency voltages vu, vv, vw respectively to the command values VU_c, VV_c, VW_c for drive voltages applied respectively to the phases U, V, W of the motor 1 respectively through the third adder 34, the fifth adder 35, and the sixth adder 36, the detected d-axis current Id_s and the detected q-axis current Iq_s which are calculated by the three-phase/dq converter 26 include high-frequency currents Id_h, Iq_h expressed by the following equation (19):

$$\begin{bmatrix} \text{Id\_h} \\ \text{Iq\_h} \end{bmatrix} = \frac{2\sqrt{3}}{3} \begin{bmatrix} \sin[\omega t + \frac{\pi}{6}] & \cos\theta \\ \cos[\omega t + \frac{\pi}{6}] & -\sin\theta \end{bmatrix} \begin{bmatrix} \text{Iu\_h} \\ \text{Iu\_h} \end{bmatrix} \quad (19)$$

$$= \frac{2\sqrt{3}}{3} \begin{bmatrix} \sin[\omega t + \frac{\pi}{6}] & \cos\theta \\ \cos[\omega t + \frac{\pi}{6}] & -\sin\theta \end{bmatrix} \begin{bmatrix} \sin(\omega s t + \alpha) \\ \sin(\omega s t + \alpha + \frac{2}{3}\pi) \end{bmatrix}$$

$$= \frac{\sqrt{3}}{3} \begin{bmatrix} \sqrt{3}\cos((\omega s - \omega)t + \alpha) \\ \sqrt{3}\sin((\omega s - \omega)t + \alpha) \end{bmatrix}$$

$$= \begin{bmatrix} \cos((\omega s - \omega)t + \alpha) \\ \sin((\omega s - \omega)t + \alpha) \end{bmatrix}$$

where $\omega$: the angular velocity of the rotor 2, $\omega s$: the angular velocity of the high-frequency voltages, and $\alpha$: the lag in phase of the high-frequency currents with respect to the high-frequency voltages.

Depending on whether the direction in which the rotor 2 is rotated (which is reversed depending on the sign of the angular velocity $\omega$) and the direction of the revolving magnetic field (which is reversed depending on the sign of the angular velocity ($\omega s$) generated by the high-frequency voltages vu, vv, vw are different from or the same as each other, the frequencies of the high-frequency currents Id_h, Iq_h vary as indicated by the following equations (20), (21):

$$|\omega s - \omega| = |\omega s| - |\omega| \quad (20)$$

In this case, the direction in which the rotor 2 rotates and the direction of the revolving magnetic field generated by the high-frequency voltages vu, vv, vw are the same as each other (when the angular velocities $\omega$, $\omega s$ have the same sign).

$$|\omega s - \omega| = |\omega s| + |\omega| \quad (21)$$

In this case, the direction in which the rotor 2 rotates and the direction of the revolving magnetic field generated by the high-frequency voltages vu, vv, vw are different from each other (when the angular velocities $\omega$, $\omega s$ have different signs).

Specifically, the frequencies of the high-frequency currents Id_h, Iq_h are higher if the direction in which the rotor 2 rotates and the direction of the revolving magnetic field generated by the high-frequency voltages vu, vv, vw are the same as each other (when the angular velocities $\omega$, $\omega s$ have the same sign) than if the direction in which the rotor 2 rotates and the direction of the revolving magnetic field generated by the high-frequency voltages vu, vv, vw are different from each other (when the angular velocities a), us have different signs).

The high-frequency adding unit 21 outputs the high-frequency voltages vu, vv, vw to generate a revolving magnetic field in the direction opposite to the direction of rotation of the motor 1. In this manner, the high-frequency current Id_h added to the detected d-axis current Id_s and the high-frequency current Iq_h added to the detected q-axis current Iq_s by adding the high-frequency voltages vu, vv, vw are reliably removed by the first low-pass filter 40 and the second low-pass filter 41.

The d-axis reference current Id_r produced by removing the high-frequency current Id_h from the detected d-axis current Id_s is input to the first subtractor 28, and the q-axis reference current Iq_r produced by removing the high-frequency current Iq_h from the detected q-axis current Iq_s is input to the second subtractor 31.

Therefore, the difference between the d-axis current and the d-axis command current Id_c and the difference between the q-axis current and the q-axis command current Iq_c are prevented from increasing due to the high-frequency currents Id_h, Iq_h. Thus, the ability of the motor 1 to cause its output torque to follow the d-axis command current Id_c and the q-axis command current Iq_c is increased.

If the removal of the high-frequency component from the detected d-axis current Id_s with the first low-pass filter 40 and the removal of the high-frequency component from the detected q-axis current Iq_s with the second low-pass filter 41 are insufficient, then the command value Vd_c for the d-axis voltage and the command value Vq_for the q-axis voltage are determined in order to eliminate the current differences due to the high-frequency components.

As a result, drive voltages VU, Vv, VW including high-frequency voltages for canceling out the high-frequency components are applied to the armatures 3, 4, 5 of the motor 1 through the dq/3-phase converter 20 and the power drive unit 22, making the high-frequency components included in the drive voltages VU, VV, VW different in waveform and phase from the high-frequency components due to the high-frequency voltages vu, vv, vw added by the high-frequency adding unit 21.

In this case, since the sine reference value Vs and the cosine reference value Vc which are calculated by the angle detector 25 according to the equations (1), (2) differ from the values with respect to the intrinsic high-frequency voltages according to the equation (5), the rotor angle calculated according to the equation (13) suffers a large error.

According to the present invention, the high-frequency adding unit 21 outputs the high-frequency voltages vu, vv, vw to generate a revolving magnetic field in the direction opposite to the direction of rotation of the motor 1 for thereby increasing the frequencies of the high-frequency current Id_h added to the detected d-axis current Id_s and the high-frequency current Iq_h added to the detected q-axis current Iq_s. The first low-pass filter 40 and the second low-pass filter 41 now have an increased ability to attenuate the high-frequency current Id_h and the high-frequency current Iq_h, thus reducing the error in detecting the rotor angle θ.

Although a certain preferred embodiment of the present invention has been shown and described in detail, it should be understood that various changes and modifications may be made therein without departing from the scope of the appended claims.

What is claimed is:

1. An apparatus for controlling a salient-pole DC brushless motor having armatures in three phases, comprising:

voltage applying means for applying drive voltages to said armatures;

high-frequency adding means for adding high-frequency voltages to said drive voltages;

first current detecting means for detecting a current flowing through an armature in a first phase of said armatures in the three phases;

second current detecting means for detecting a current flowing through an armature in a second phase of said armatures in the three phases;

reference value extracting means for extracting a sine reference value depending on the sine value of a twofold angle which is twice a rotor angle of said motor and a cosine reference value depending on the cosine value of the twofold angle, using a first current value detected by said first current detecting means and a second current value detected by said second current detecting means when said high-frequency voltages are added to said drive voltages by said high-frequency adding means, and high-frequency components depending on said high-frequency voltages;

rotor angle calculating means for calculating a rotor angle of said motor using said sine reference value and said cosine reference value;

three-phase/dq converting means for handling said motor as an equivalent, circuit having a q-axis armature disposed on an q-axis in the direction of magnetic fluxes from a rotor of the motor and a d-axis armature disposed on a d-axis which is perpendicular to the q-axis, and calculating a detected q-axis current flowing through said q-axis armature and a detected d-axis current flowing through said d-axis armature based on the rotor angle of said motor which is calculated by said rotor angle calculating means, said first current value, and said second current value; and current control means for determining said drive voltages so that a q-axis reference current produced by passing said detected q-axis current through a low-pass filter and a d-axis reference current produced by passing said detected d-axis current through a low-pass filter will be equalized to a predetermined q-axis command current and a predetermined d-axis command current, respectively;

wherein said high-frequency voltages are set so that the direction of a revolving magnetic field generated when said high-frequency voltages are applied to the armatures of said motor and the direction in which said motor is rotated by said drive voltages are opposite to each other.

2. An apparatus according to claim 1, wherein said reference value extracting means comprises means for extracting said sine reference value and said cosine reference value respectively according to the following equations (22), (23)

$$Vs = \int_0^{\frac{2\pi}{\omega}} \left\{ \cos 2\omega t \cos\left(\omega t + \frac{2}{3}\pi\right) \cdot Iu - \cos 2\omega t \cos \omega t \cdot Iw \right\} dt \quad (22)$$

$$Vc = -\int_0^{\frac{2\pi}{\omega}} \left\{ \sin 2\omega t \cos\left(\omega t + \frac{2}{3}\pi\right) \cdot Iu - \sin 2\omega t \cos \omega t \cdot Iw \right\} dt \quad (23)$$

where Vs: the sine reference value, Vc: the cosine reference value, Iu: the first current value, Iw: the second current value, and ω: the angular velocity of said high-frequency voltages.

3. A method of detecting a rotor angle of a salient-pole DC brushless motor having armatures in three phases controlled by an apparatus, said apparatus comprising:

voltage applying means for applying drive voltages to said armatures;

first current detecting means for detecting a current flowing through an armature in a first phase of said armatures in the three phases;

second current detecting means for detecting a current flowing through an armature in a second phase of said armatures in the three phases;

three-phase/dq converting means for handling said motor as an equivalent circuit having a q-axis armature disposed on a q-axis in the direction of magnetic fluxes from a rotor of the motor and a d-axis armature disposed on a d-axis which is perpendicular to the q-axis, and calculating a detected q-axis current flowing through said q-axis armature and a detected d-axis current flowing through said d-axis armature based on the rotor angle of said motor, said first current value, and said second current value; and current control means for determining said drive voltages so that a q-axis reference current produced by passing said detected q-axis current through a low-pass filter and a d-axis reference current produced by passing said detected d-axis current through a low-pass filter will be equalized to a predetermined q-axis command current and a predetermined d-axis command current, respectively;

wherein said method comprises the step of:

adding said high-frequency voltages, which are set so that the direction of a revolving magnetic field generated when said high-frequency voltages are applied to the armatures of said motor and the direction in which said motor is rotated by said drive voltages are opposite to each other, to said drive voltage;

calculating a sine reference value depending on the sine value of a twofold angle which is twice a rotor angle of said motor and a cosine reference value depending on the cosine value of the twofold angle, using a first current value detected by said first current detecting means and a second current value detected by said second current detecting means when said high-frequency voltages are added to said drive voltages, and high-frequency components depending on said high-frequency voltages; and calculating a rotor angle of said motor using said sine reference value and said cosine reference value.

4. A method according to claim 3, wherein said step of calculating said sine reference value and said cosine reference value further comprising the step of extracting said sine reference value and said cosine reference value respectively according to the following equations (24), (25)

$$Vs = \int_0^{\frac{2\pi}{\omega}} \left\{ \cos2\omega t \cos\left(\omega t + \frac{2}{3}\pi\right) \cdot Iu - \cos2\omega t \cos\omega t \cdot Iw \right\} dt \quad (24)$$

$$Vc = -\int_0^{\frac{2\pi}{\omega}} \left\{ \sin2\omega t \cos\left(\omega t + \frac{2}{3}\pi\right) \cdot Iu - \sin2\omega t \cos\omega t \cdot Iw \right\} dt \quad (25)$$

where Vs: the sine reference value, VC: the cosine reference value, Iu: the first current value, Iw: the second current value, and w: the angular velocity of said high-frequency voltages.

* * * * *